US009678478B2

(12) United States Patent
Hendricks

(10) Patent No.: US 9,678,478 B2
(45) Date of Patent: Jun. 13, 2017

(54) FACETTED JEWEL BEARINGS

(71) Applicant: University of Massachusetts Medical School, Boston, MA (US)

(72) Inventor: Gregory Hendricks, Sutton, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 14/909,804

(22) PCT Filed: Aug. 12, 2014

(86) PCT No.: PCT/US2014/050684
§ 371 (c)(1),
(2) Date: Feb. 3, 2016

(87) PCT Pub. No.: WO2015/023650
PCT Pub. Date: Feb. 19, 2015

(65) Prior Publication Data
US 2016/0195852 A1 Jul. 7, 2016

Related U.S. Application Data

(60) Provisional application No. 61/866,627, filed on Aug. 16, 2013.

(51) Int. Cl.
*F16C 23/02* (2006.01)
*G04B 31/04* (2006.01)
(Continued)

(52) U.S. Cl.
CPC ............ *G04B 31/008* (2013.01); *A61M 1/10* (2013.01); *G01C 17/00* (2013.01); *H02K 5/16* (2013.01); *F16C 17/04* (2013.01); *F16C 23/02* (2013.01)

(58) Field of Classification Search
CPC .. F16C 29/0602; F16C 29/0635; F16C 23/02; F16C 17/04; B29C 45/14311;
(Continued)

(56) References Cited

U.S. PATENT DOCUMENTS 1,976,181 A * 10/1934 Marti ..................... G04B 31/04
368/326
2,006,606 A * 7/1935 Roman .................. G04B 31/02
368/326
(Continued)

FOREIGN PATENT DOCUMENTS

| CH | 698675 B1 * | 9/2009 | ............. G04B 31/04 |
| IL | WO 0101879 A1 * | 1/2001 | ............... A61C 1/05 |
| SU | 1108386 A1 * | 8/1984 | |

*Primary Examiner* — Marcus Charles
(74) *Attorney, Agent, or Firm* — Milstein Zhang & Wu LLC

(57) ABSTRACT

The invention provides bearing systems characterized by single point contact with each jewel segment and a spring-loaded assembly with protection from radial and thrust forces. An important feature of jewel bearings of the invention is that they are self-lubricating, i.e., no oil or grease lubricants are needed. This can be a major advantage in medical and precision equipment. A secondary important feature is the reduced friction and effective heat-dissipation due to the unique design of the invention with significant reduction in contact surfaces and friction, which significantly prolong the lifespan of the bearings. Another advantage of the present invention is the substantial reduction in audible noise due to the unique design. Furthermore, the invention allows the use of relatively low cost synthetic jewel segments in bearings.

14 Claims, 7 Drawing Sheets

(51) Int. Cl.
   *F16C 17/04*   (2006.01)
   *G04B 31/008*  (2006.01)
   *A61M 1/10*    (2006.01)
   *G01C 17/00*   (2006.01)
   *H02K 5/16*    (2006.01)

(58) Field of Classification Search
   CPC ...... B29C 2045/14327; B29K 2705/00; B29L
   2031/04; G04B 31/008; G04B 31/0012;
   G04B 31/04
   USPC ........ 384/44, 129, 213, 244, 907.1, 913, 42;
   501/153, 126
   See application file for complete search history.

(56) References Cited

U.S. PATENT DOCUMENTS

| | | | | |
|---|---|---|---|---|
| 2,602,986 | A * | 7/1952 | Centini | G04D 3/042 |
| | | | | 100/258 R |
| 3,428,374 | A * | 2/1969 | Hudacko | F16C 11/0614 |
| | | | | 384/213 |
| 4,866,823 | A * | 9/1989 | Magnien | A44C 17/043 |
| | | | | 29/10 |
| 5,957,672 | A * | 9/1999 | Aber | A61M 1/10 |
| | | | | 384/907.1 |
| 6,698,918 | B2 * | 3/2004 | Durand | G04B 19/10 |
| | | | | 29/10 |
| 2005/0007888 | A1 * | 1/2005 | Jolidon | G04B 1/12 |
| | | | | 368/110 |
| 2015/0119744 | A1 * | 4/2015 | Lawson | A61B 5/09 |
| | | | | 600/539 |
| 2015/0159926 | A1 * | 6/2015 | Beach | F25B 21/04 |
| | | | | 62/3.3 |

* cited by examiner

FACETTED JEWEL BEARINGS

PRIORITY CLAIMS AND RELATED PATENT APPLICATIONS

This application is the U.S. national phase of and claims priority to PCT/US14/50684, filed Aug. 12, 2014, which claims the benefit of priority from U.S. Provisional Application Ser. No. 61/866,627, filed on Aug. 16, 2013, the entire content of each of which is incorporated herein by reference in its entirety.

TECHNICAL FIELD OF THE INVENTION

The invention generally relates to jewel bearings. More particularly, the invention relates to a novel jewel bearing system characterized by self-lubrication, reduced heat generation and increased heat dissipation.

BACKGROUND OF THE INVENTION

Bearings are widely needed mechanical components that are used to constrain relative motion between moving parts to only the desired motion. Ball bearings are used to reduce rotational friction and support radial and axial loads. Ball bearings are rolling-element bearings that use balls to maintain separation between bearing races. It achieves this by using at least two races to contain the balls and transmit the loads through the balls. For a ball bearing to operate properly, it needs to be lubricated, e.g., by oil or grease.

Jewel bearings have been used in fine watches, gyroscopes and laboratory equipment for years. Jewel bearings are plain bearings wherein a metal spindle turns in a jewel-lined pivot hole. The hole is typically shaped like a torus and is slightly larger than the shaft diameter. Typically found in mechanical watches, a donut-shaped bearing is usually made of synthetic sapphire (ruby) and is press-fitted into a hole in the movement's supporting plate. A lubricant reservoir is nearby holding a lubricating oil that is in contact with the bearing shaft by capillary action.

The conventional design for jewel bearings for rotating equipment is to bore an oval shaped hole in the jewel (donut-shaped bearing) or provide a cone shaped pivot hole for a spindle to locate in. Such design cannot be used in any application requiring radial or thrust loading on the bearing because of the possibility of jewel fracturing. Thus, many potential applications such as high-speed turbines cannot use such a design.

U.S. Pat. No. 7,959,551 to Jarvik proposes blood pump bearings having a three post contact system to allow blood flow in a heart pump. This concept, while may be sufficient for the unique application, would not be satisfactory for supporting higher radial or thrust loads that would be presented in normal motor or turbine applications. Historically ball bearing technology has demonstrated the requirement of at least five-ball contact in the bearing races for even the smallest motors.

Thus, there is an ongoing need for improved bearing systems that do not require lubrication while at the same time have reduced heat generation and increased heat dissipation.

SUMMARY OF THE INVENTION

The invention provides a groundbreaking approach to jewel bearings. The jewel bearing systems according to the invention are characterized by the capability of self-lubrication, reduced heat generation and increased heat dissipation.

In one aspect, the invention generally relates to a jewel bearing assembly. The jewel bearing assembly includes: a shaft having a cylindrical surface and a rotational axis; a plurality of jewel segments radially and axially secured in a jewel carrier so configured to be radially evenly spaced around the shaft; and a containment cup for housing the jewel carrier. The shaft includes a collar for engaging the front surface of the jewel segments. Each jewel has a single contact point with the collar at the top surface of the jewel segment.

In another aspect, the invention generally relates to a self-lubricating jewel bearing assembly, comprising a plurality of jewel segments radially and axially secured around a shaft comprising a collar for engaging the jewel segments, and wherein each jewel has a single contact point with the collar at the top surface of the jewel segment.

In yet another aspect, the invention generally relates to an article of manufacture comprising a jewel bearing assembly of the invention.

DETAILED DESCRIPTION OF THE INVENTION

The invention provides a novel approach to jewel bearings. Bearing systems of the invention are characterized by single point contact with each jewel segment and a spring-loaded assembly with protection from radial and thrust forces. An important feature of jewel bearings of the invention is that they are self-lubricating, i.e., no oil or grease lubricants are needed. This can be a major advantage in medical and precision equipment. A secondary important feature is the reduced friction and the resulting reduction in heat generation coupled with effective heat-dissipation due to the unique design of the invention with significant reduction in contact surfaces and friction, which significantly prolong the lifespan of the bearings. Another advantage of the present invention is the substantial reduction in audible noise. Furthermore, the invention allows the use of relatively low cost synthetic jewel segments in bearings.

The jewel bearings of the invention are particularly advantageous in medical use where components must undergo multiple autoclave sterilizations. Another application is in turbines that operate at high speed (e.g., 100,000 RPM and above) where normal bearings fail due to lack of adequate lubrication. This invention provides a cost-effective system with much reduced friction and heat-related problem.

Figure 1:
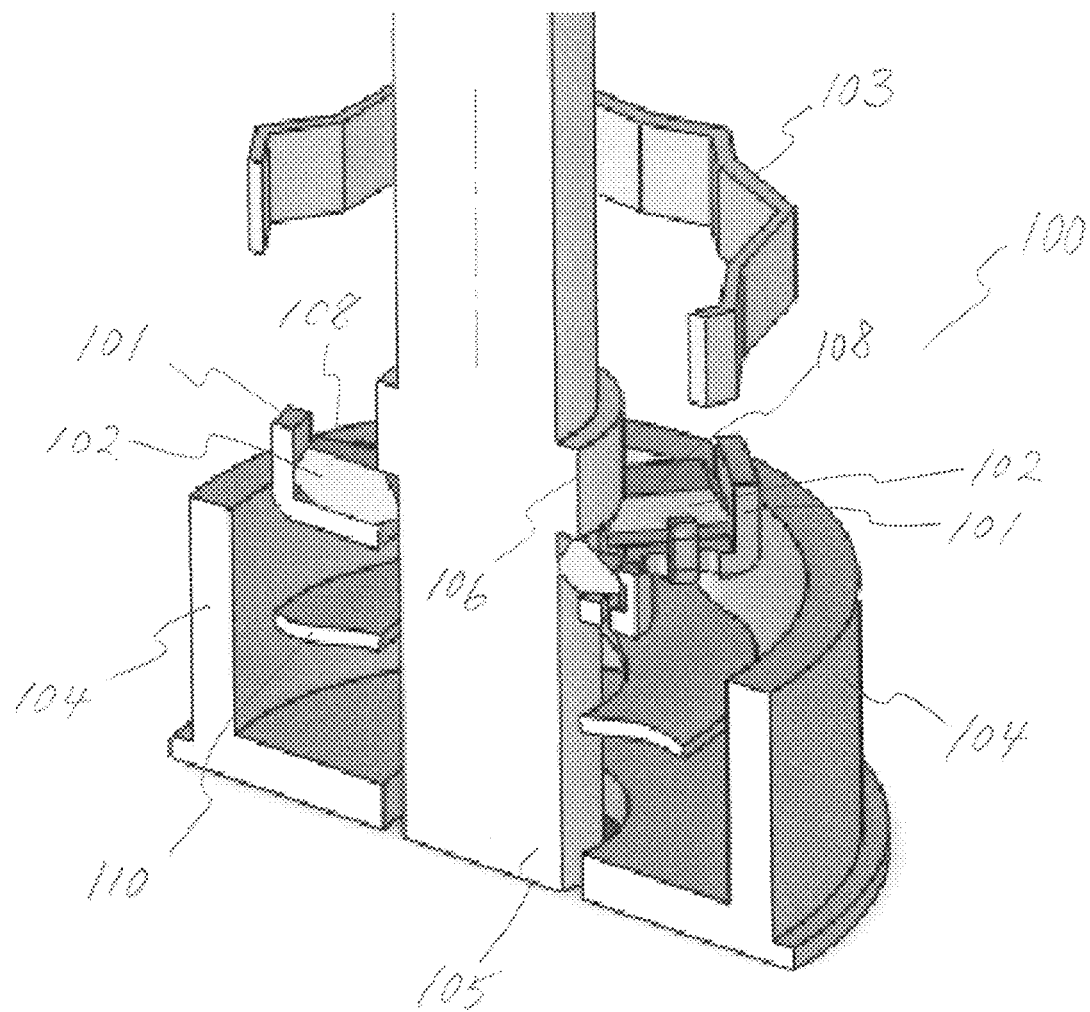
FIG. 1 schematically depicts a cross-sectional view of an exemplary embodiment of the jewel bearing assembly according to the invention.

Referring to FIG. 1, which schematically depicts a cross-sectional view of an exemplary embodiment of the jewel bearing assembly (100) including a jewel carrier (101). The jewel carrier (101) may be made from stainless steel and the jewel segments (102) are secured radially and axially therein. The jewel carrier (101) is then radially supported by a spring washer (103) inserted between the jewel carrier (101) and a containment cup (104). To offer thrust capability the mating rotating shaft (105) is provided with a "washer shaped" collar (106) of the shaft (105) that engages the front surface (108) of the jewel segments (102) to provide thrust along the axis normal to the gem surface (108).

The surface opposite the jewel segments on the jewel carrier (101) has spring projections (110) that engage the outer containment cup (104) offering flexible support to the axial direction of the shaft movement.

Figure 2:
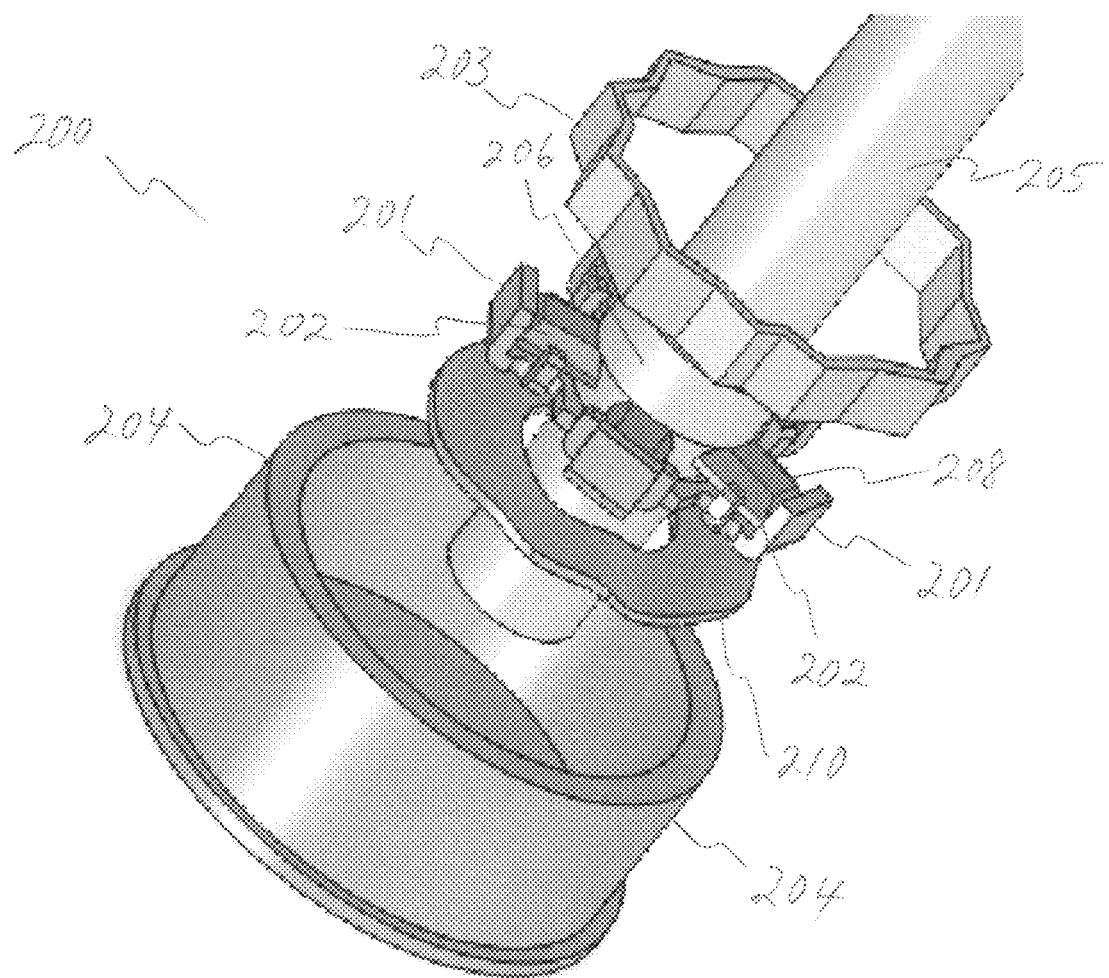
FIG. 2 schematically depicts a perspective view of an exemplary embodiment of the jewel bearing assembly according to the invention.

FIG. 2 schematically depicts a perspective view of an exemplary embodiment of the jewel bearing assembly (200) and various components, including a jewel carrier (201), the jewel segments (202), the outer containment cup (104), the bottom "wavy" spring washer (211), the outer radial spring (203) inserted between the jewel carrier (201) and a containment cup (204). A "washer shaped" collar (206) is provided with the mating rotating shaft (205) for engagement with the front surface (208) of the jewel segments (202) to provide thrust along the axis normal to the gem surface. Also shown is a spring (210) for axially supporting the jewel carrier (201).

The outer radial spring (203) may be made from a strip of formed steel and is set in place of the bearing outer containment cup (204) under tension. The jewel carrier (202) is inserted into the outer radial spring (203).

Figure 3:
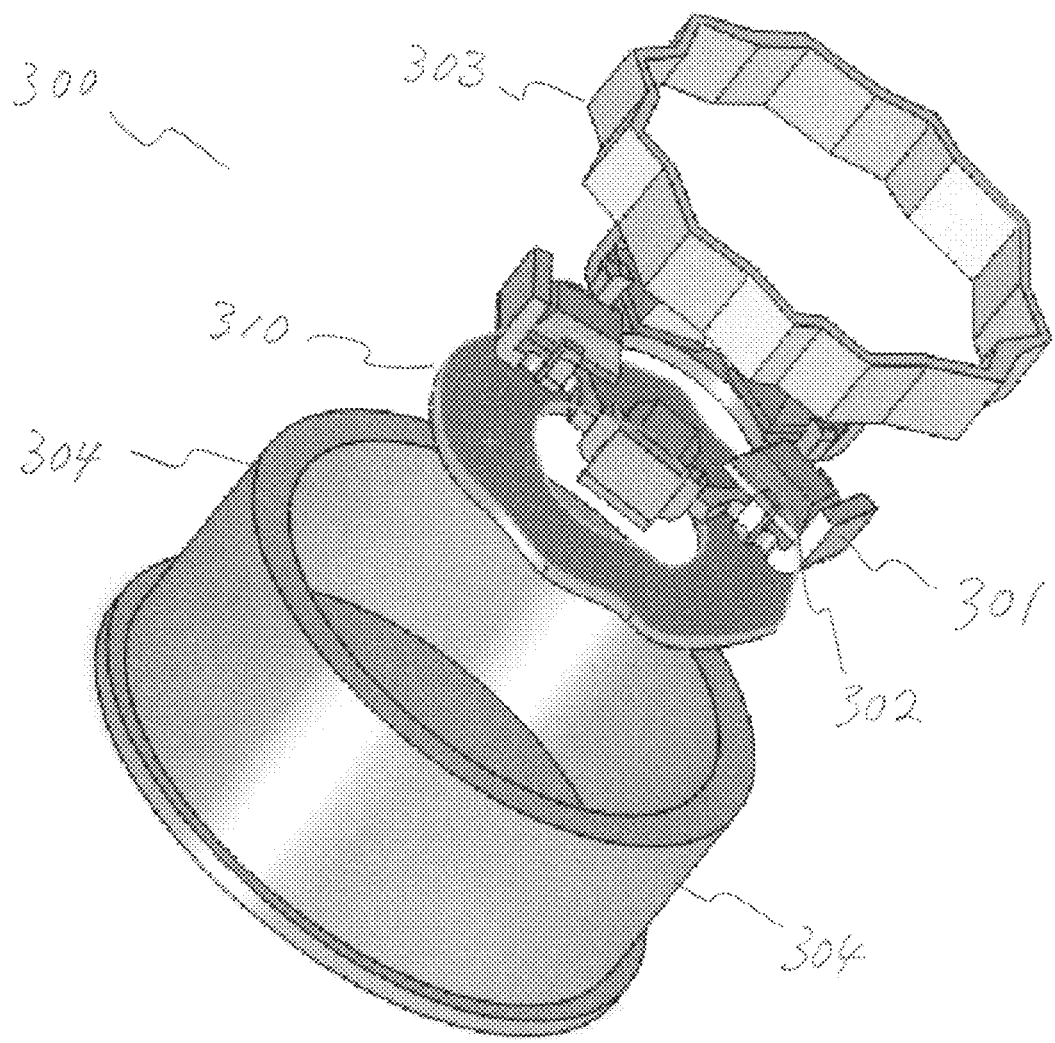
FIG. 3 schematically depicts a perspective view of an exemplary embodiment of the jewel bearing assembly according to the invention.

FIG. 3 schematically depicts a perspective view of an exemplary embodiment of the jewel bearing assembly (300) and showing the securing the various components. The jewel carrier (301) is made from stamped stainless steel and the locating tabs ( ) are punched bottom from a single piece of material. The single piece of material allows ease of high precision fabrication whereby the tool stamped pocket feature in the spring steel receives the jewel segment (302) under tension at deliberate points of contact. This insures that the jewel segments are held in the correct orientation. The bottom wavy washer (310) shown bears against the base of the outer containment cup (304) and the bottom of the jewel carrier (301).

Figure 4:
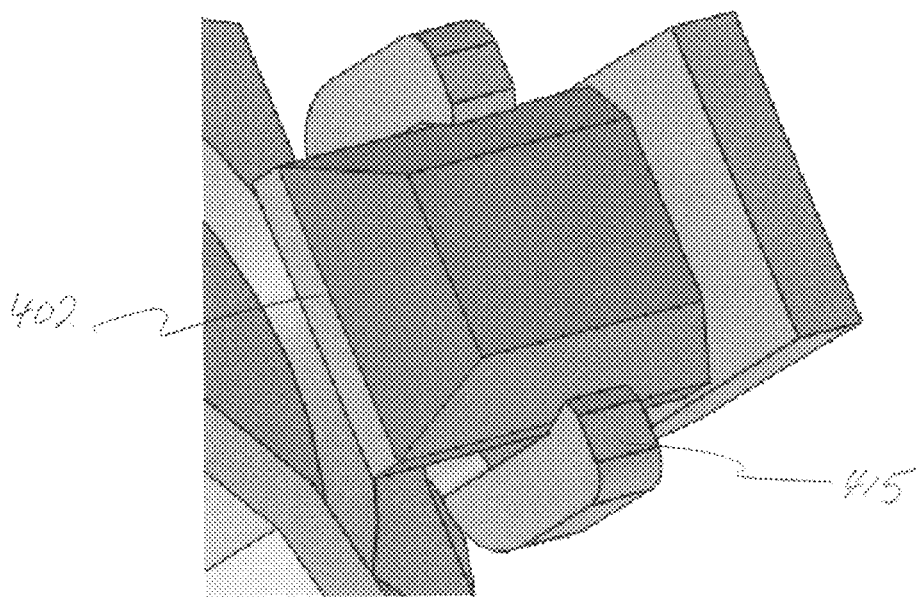
FIG. 4 schematically depicts a perspective view an exemplary embodiment of the jewel segment according to the invention.

FIG. 4 schematically depicts a perspective view of the jewel segment (402) being captured within the tine shaped feature (415) of the stamping of the jewel carrier (401). The jewel segments (402) are shown captured in the jewel carrier (402) by the spring force exerted on the relative surfaces. Such a design allows the implementation of the low-cost jewel segments in lieu of drilling holes in solid jewel. A variety of jewel cut types and face angles can be easily accommodated. A common baguette cut is illustrated.

Figure 5:
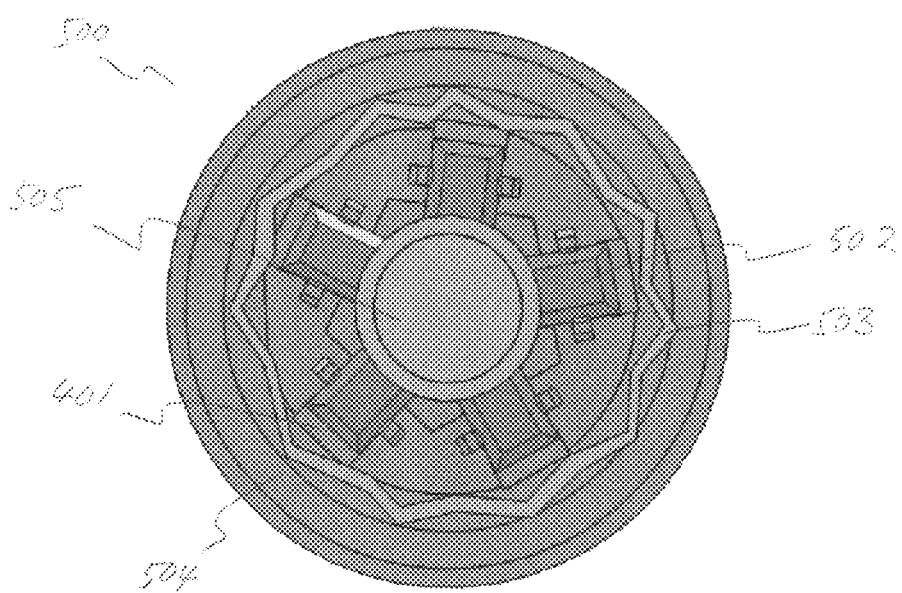
FIG. 5 schematically depicts the various components of an exemplary embodiment of the jewel bearing assembly according to the invention.

FIG. 5 schematically depicts the various components of the jewel bearing assembly through the axis of the shaft.

Figure 6:
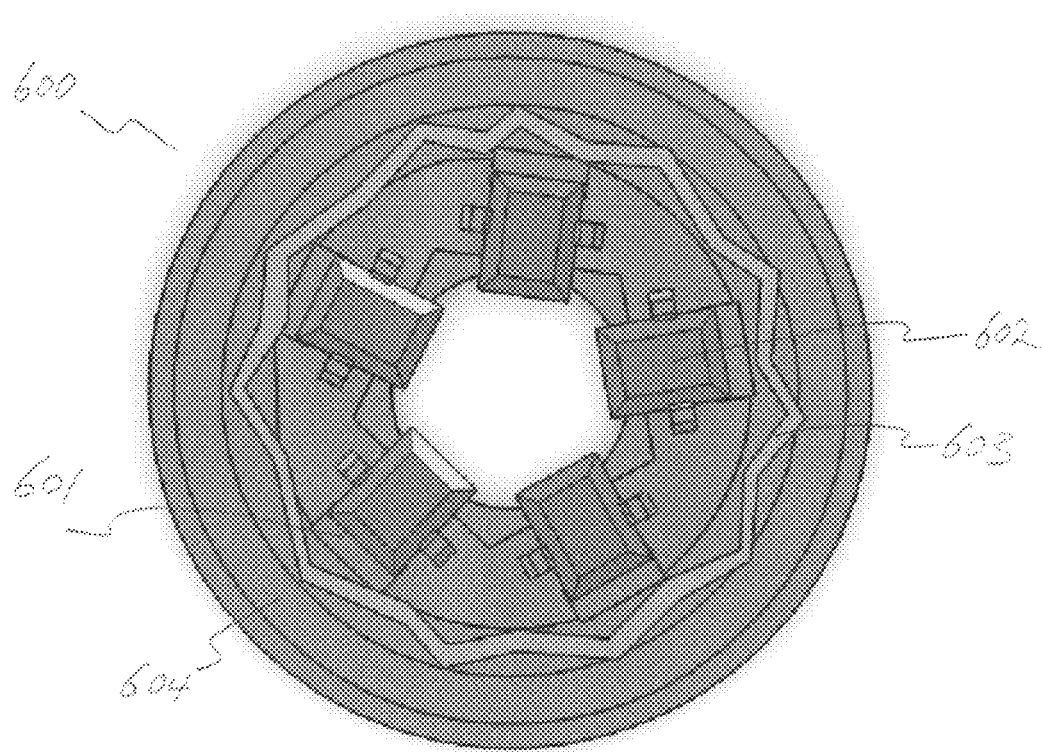
FIG. 6 schematically depicts the concentric view of an exemplary embodiment of the jewel bearing assembly according to the invention.

FIG. 6 schematically depicts the concentric view of the jewel bearing assembly (600) without the shaft. This shows the circle inscribed by the faces of the surfaces of the jewel segments (602) that will come in contact with cylindrical rotating surface of the shaft.

Figure 7:
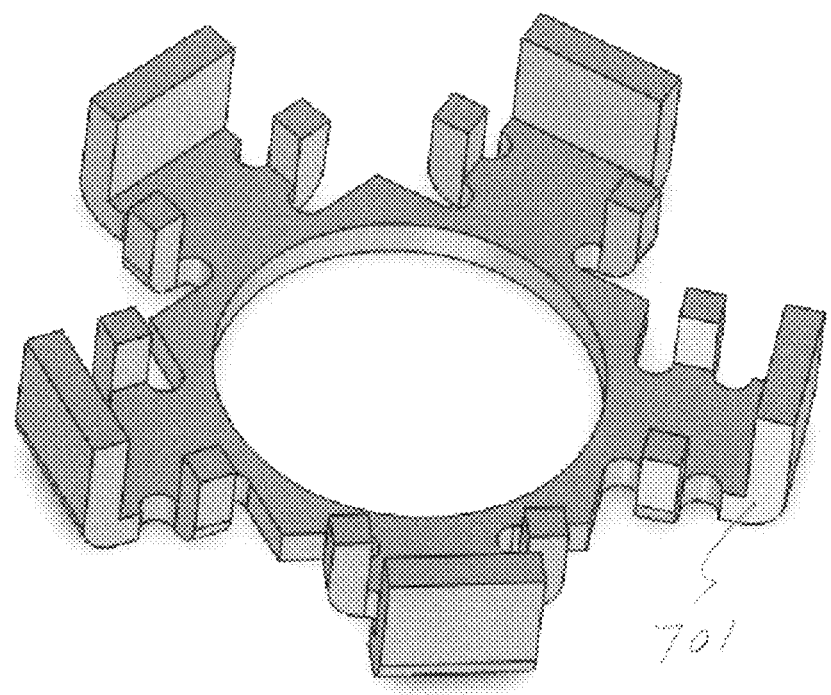
FIG. 7 schematically depicts the jewel carrier of an exemplary embodiment of the jewel bearing assembly according to the invention.

FIG. 7 schematically depicts the jewel carrier (701) as fabricated in a flat stainless steel stamping process to create the feature shapes and bent angles of the tines to retain the jewel segments in their relative positions. The un-crimped tines are illustrated. The use of steel also provides a thermal path to conduct heat away from the shaft friction and conducts the heat to the carrier.

Regarding thermal transfer and heat dissipation, thermal contacts of the jewel segments and the jewel carrier with the radial outer spring and the wavy bottom washer provide the thermal path to the outer containment cup. The overall thermal transfer may be described as a series summation of the thermal transfer at each mechanical contact junction. The design of the invention reduce total thermal impedance by limiting the total number of junctions, using similar high hardness materials to reduce friction at each junction, and increasing the thermal transfer from the rotating shaft to the outside bearing housing construction through use of high thermal conductive materials.

It is noted that, while the method of construction shown is the preferred method of assembly, it is possible to employ other assembly methods such as silicon rubber potting or flexible adhesive where thermal considerations are not as stringent.

In one aspect, the invention generally relates to a jewel bearing assembly. The jewel bearing assembly includes: a shaft having a cylindrical surface and a rotational axis; a plurality of jewel segments radially and axially secured in a jewel carrier so configured to be radially evenly spaced around the shaft; and a containment cup for housing the jewel carrier. The shaft includes a collar for engaging the front surface of the jewel segments. Each jewel has a single contact point with the collar at the top surface of the jewel segment.

In certain embodiments, the jewel bearing assembly further includes one or more support components placed between the containment cup and the jewel carrier providing flexible support to the axial direction of the shaft movement.

In certain embodiments, the jewel bearing assembly further includes one or more support components placed between the containment cup and the jewel carrier providing flexible support to the radial direction of the shaft movement.

The one or more support components may be selected from coil springs, silicon rubber pads, shock absorbers and dashpot dampeners.

In certain embodiments, the plurality of jewel segments are made from a mineral of aluminum oxide. The mineral of aluminum oxide may be natural or synthetic. In certain embodiments, the jewel segments are made from Sapphire or Ruby gemstones. Corundum (Sapphire and Ruby) are considered gemstones. There are a variety of aluminum oxide minerals with the general chemical structure of $\alpha\text{-}Al_2O_3$. Trace amounts of other elements such as iron, titanium or chromium can give corundum blue, yellow, pink, purple, orange, or greenish color. Chromium impurities in corundum yield a red tint, and the resultant is called a ruby.

The jewel carrier may be made from any material suitable for the intended application. In certain embodiments, the jewel carrier is made from stainless steel.

The jewel bearing assembly typically includes 5, 6, 7, 8 or more jewel segments. The jewel bearing assemblies of the invention are especially suited for application that require and prefer continued use without lubrication.

In another aspect, the invention generally relates to a self-lubricating jewel bearing assembly, comprising a plurality of jewel segments radially and axially secured around a shaft comprising a collar for engaging the jewel segments, and wherein each jewel has a single contact point with the collar at the top surface of the jewel segment.

In yet another aspect, the invention generally relates to an article of manufacture comprising a jewel bearing assembly of the invention.

The article of manufacture may be any article including or using the jewel bearing assembly of the invention, for example, a motor, a turbine, a generator, a watch, a gyroscope, a compass, or a pump (e.g., a heart pump).

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A self-lubricating jewel bearing assembly, comprising:
   a shaft having a cylindrical surface and a rotational axis;
   a plurality of 5 or more facetted jewel segments made from a mineral of aluminum oxide, each facetted jewel segment of having a front surface and a top surface, wherein the plurality of facetted jewel segments are radially and axially secured in a stainless steel jewel carrier so configured to be radially evenly spaced around the shaft; and
   a containment cup for housing the jewel carrier,
   wherein the shaft comprising a collar for engaging the front surface of the each of the plurality of facetted jewel segments, and wherein each facetted jewel has a single contact point with the collar at the top surface of the facetted jewel segment.

2. The jewel bearing assembly of claim 1, further comprising one or more support components placed between the containment cup and the jewel carrier providing flexible support to the axial direction of the shaft movement.

3. The jewel bearing assembly of claim 2, further comprising one or more support components placed between the containment cup and the jewel carrier providing flexible support to the radial direction of the shaft movement.

4. The jewel bearing assembly of claim 3, wherein the one or more support components are selected from coil springs, silicon rubber pads, shock absorbers and dashpot dampeners.

5. The jewel bearing assembly of claim 4, wherein the mineral of aluminum oxide is natural.

6. The jewel bearing assembly of claim 4, wherein the mineral of aluminum oxide is synthetic.

7. The jewel bearing assembly of claim 1, wherein the jewel segments are made from Sapphire or Ruby gemstones.

8. The jewel bearing assembly of claim 1, having 6 facetted jewel segments.

9. The jewel bearing assembly of claim 1 suitable for continued use without lubrication.

10. An article of manufacture comprising a jewel bearing assembly of claim 1.

11. The article of manufacture of claim 10, wherein the article is a motor, a turbine, a generator, a watch, a gyroscope, a compass, or a pump.

12. The article of manufacture of claim 11, wherein the article is a heart pump.

13. The article of manufacture of claim 11, wherein the article is a gyroscope.

14. The article of manufacture of claim 11, wherein the article is a turbine.

* * * * *